April 25, 1950  J. H. WALLING  2,505,445
SICKLE BAR LIFTER
Filed April 15, 1946

INVENTOR.
James H. Walling
BY
Glenn L. Fish
ATTORNEY

Patented Apr. 25, 1950

2,505,445

UNITED STATES PATENT OFFICE 2,505,445

SICKLE BAR LIFTER

James H. Walling, Spokane, Wash.

Application April 15, 1946, Serial No. 662,337

2 Claims. (Cl. 56—25)

1

This invention relates to mechanism for lifting the sickle bar of a mowing machine and one object of the invention is to provide mechanism by means of which the sickle bar may be swung vertically to a raised position without it being necessary to have an operator ride the mowing machine. It will thus be seen that when a mowing machine is hitched back of a tractor a single operator may ride the tractor and the sickle bar be swung upwardly for passing over a rock or other obstruction in a field by mechanism under control of the operator of the tractor.

Another object of the invention is to provide a mowing machine with mechanism for lifting its sickle bar which may be actuated by the driver of a tractor but will not interfere with lifting the sickle bar by a person riding the mowing machine in case the mowing machine is drawn forwardly by horses. It will thus be seen that the improved lifting mechanism for the sickle bar may be built onto a mowing machine of conventional construction and removed therefrom when so desired.

Another object of the invention is to provide a mowing machine with mechanism for lifting its sickle bar so constructed and so connected with the tractor to which the mowing machine is hitched that it may be operated by the driver of the tractor or operated automatically by pull exerted upon a chain or cable when the mower is turned toward one side. It will thus be seen that when a turn is made at a corner of a field the sickle bar will be automatically swung upwardly while a turn is made.

Another object of the invention is to provide mechanism for raising a sickle bar which is simple in construction and capable of being very easily applied to a mowing machine of conventional construction and not liable to become broken or get out of order when in use.

The invention is illustrated in the accompanying drawings wherein.

Figure 1:
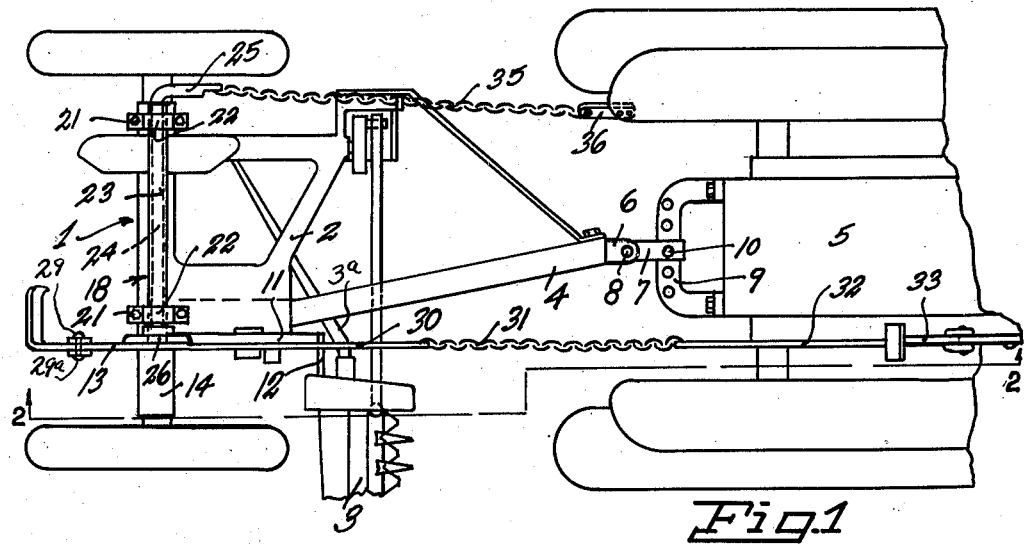
Fig. 1 is a top plan view of a mowing machine hitched back of a tractor and provided with the improved mechanism for raising its sickle bar.
Figure 2:
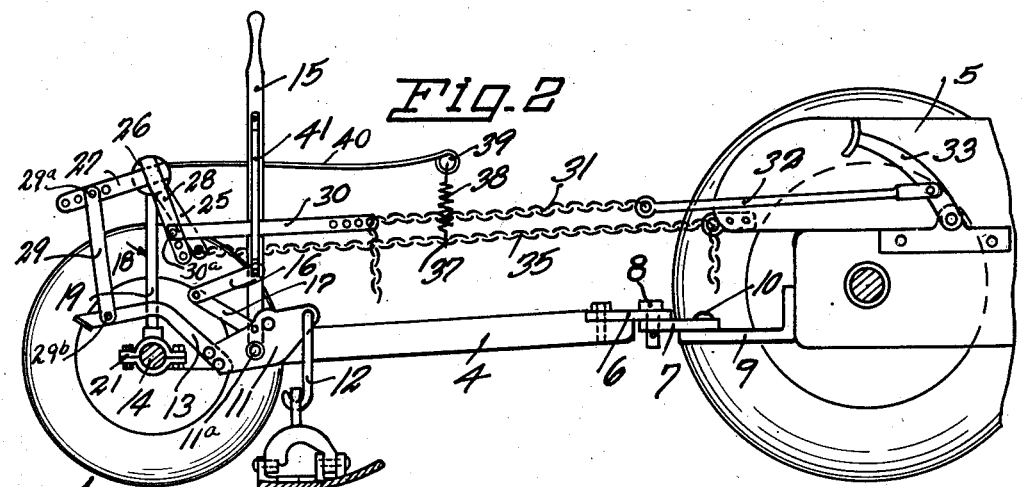
Fig. 2 is a view taken along line 2—2 of Figure 1.
Figure 3:
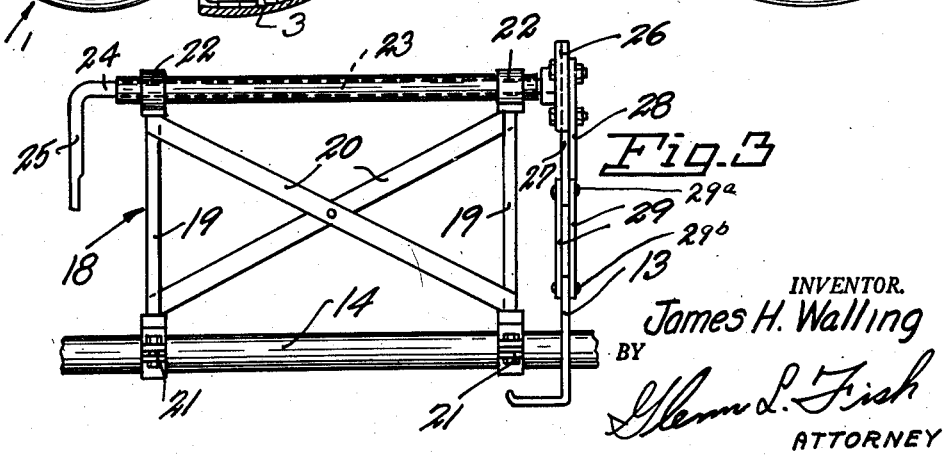
Fig. 3 is a rear view upon an enlarged scale of the lifting mechanism for a sickle bar.

The mowing machine which is indicated in general by the numeral 1 is of conventional construction, such as shown in the patent to Coultas issued September 8, 1931, and having Patent No. 1,822,204, and has the usual frame 2 and sickle bar 3 which extends from one side of the mow-

2 ing machine and is pivotally mounted at its inner end to a support 3ª for vertical swinging movement from a lowered position for use to a raised position when such movement is necessary in order to allow the sickle bar to pass over a rock or other obstruction in the field. The usual tongue 4 extends forwardly from the mowing machine and since the mowing machine is to be towed back of a tractor 5 the tongue has been shortened and a clevice 6 applied to its front end. This clevice is connected with a link 7 by a pin 8 and the link so connected with the yoke 9 of the tractor by a pin 10. If it is desired to hitch horses to the mowing machine a tongue of the usual length will be applied in place of the shortened tongue.

At one side of the frame 2 is a rocker member or plate 11 which is pivotally mounted midway its length by a fulcrum 11ª and at its front end carries a depending hook or link 12 connected with the inner portion of the sickle bar. At its rear end the rocker plate carries a lever 13 which extends rearwardly therefrom and across the rear axle 14 of the mowing machine. A hand operated lever 15 is pivotally mounted upon the frame 2 adjacent the plate 11 by the fulcrum 11ª and this lever is connected with the plate by links 16 and 17 so that when a person riding the mowing machine grasps the lever 15 and swings it rearwardly the plate will be rocked about its pivot and its front end tilted upwardly to raise the hook 12 and thus swing the sickle bar upwardly and allow it to pass over an obstruction.

A support 18 is mounted transversely of the mowing machine over the rear axle 14 and consists of side standards 19 which are braced by diagonally extending braces 20 and have their lower ends firmly secured by clamps 21. Upper clamps 22 are carried by the standards 19 and through these clamps is mounted a pipe or tube 23 serving as an elongated bearing for a rocker shaft 24 having one end portion bent to form a downwardly extending lever or arm 25. A head 26 is formed at the other end of the shaft 24 and to this head are rigidly secured arms or levers 27 and 28, the arm 27 extending rearwardly from the shaft and the arm 28 extending downwardly therefrom. Strips or links 29 extend between the arm 27 and the lever 13 and have their upper and lower ends pivotally connected therewith by pins 29ª and 29ᵇ, and when forward pull is exerted upon the arm or lever 28 to turn the shaft 24 the lever 13 will be tilted to rock the plate about its pivot and raise the sickle bar. A bar or elongated link 30 which is connected at its rear end to the arm or lever 28 by a pin 30ª extends forwardly therefrom and to this bar is attached a chain 31 constituting a flexible connection between the bar 30 and a link 32 carried by the foot pedal 33 which is pivoted to a mounting bracket carried by the tractor in such position that a person occupying the usual seat of the tractor may place his foot upon the pedal and push the pedal forwardly when it is desired to exert pull upon the bar 30 and swing the sickle bar upwardly. Since the bar 30 is connected with the link 32 by a chain the tractor may be turned toward the right or the left without interference by a stiff connection between the link and the bar.

When the mowing machine is in use it is turned toward the right at a corner of a field and during such turning movement the sickle bar should be swung to a raised position and prevent interference with the turning movement by the sickle bar. In order that during this turning movement the sickle bar may be automatically raised and then lowered after a turn has been made there has been provided a chain 35 having its rear end connected with the lower end of the arm or lever 25 and its front end connected with a strip or plate 36 carried by the tractor at the opposite side thereof from the pedal 33. The chain 35 is supported by a ring or hook 37 at the lower end of a spring 38 which is suspended from an eye 39 at the front end of a rod 40 and in order to guide movement of the lever 15 and the strip 30 relative to each other there has been provided a strip 41 which extends longitudinally of the lever 13 and across the strip or bar 30 and has its upper and lower ends secured to the lever 15. When the tractor is turned toward the right or toward the side of the mowing machine from which the sickle bar projects pull will be exerted upon the lever 25 by the chain and the rocker shaft rotated in a direction to effect raising of the sickle bar. When the turn is completed and the tractor resumes a position directly ahead of the mowing machine pull upon the chain 35 will be released and the weight of the sickle bar will return it to the lowered position for use. It will thus be seen that raising of the sickle bar may be accomplished automatically as well as manually.

Having thus described the invention, what is claimed is:

1. A tractor, a mowing machine hitched back of said tractor and having a frame and a sickle bar extending laterally from one side thereof and tiltable vertically transversely of the frame to raised and lowered positions, a rocker plate on the frame extending longitudinally thereof and pivoted for vertical tilting movement and having one end connected with said sickle bar by a depending link, a support rising from the rear portion of said frame transversely thereof and carrying a bearing sleeve extending transversely of the mowing machine, a shaft rotatably mounted through said bearing sleeve and having a rearwardly extending arm at the side of the frame carrying the rocker member, a lever extending rearwardly from the rear end of said rocker member, a link connecting the rearwardly extending arm of said shaft with said lever for tilting the rocker member and raising the sickle bar when the shaft is turned in a direction to swing its arm downwardly, an arm extending downwardly from said shaft at the opposite side of the frame from the sickle bar, and a flexible connection between the downwardly extending arm and the tractor for exerting pull upon the arm and automatically rotating the shaft in a direction to raise the sickle bar when the tractor is turned toward the side of the mowing machine from which the sickle bar projects.

2. A tractor, a mowing machine back of said tractor having a frame and a tongue extending forwardly therefrom and hitched to the tractor said mowing machine having a sickle bar extending laterally from one side thereof and tiltable vertically transversely of the frame from a lowered position for use to a raised position, an upright support carried by the frame of the mowing machine and extending transversely thereof, a shaft extending transversely of said support and rotatably mounted and having a head at one end carrying a rearwardly extending arm and a second arm extending downwardly at a forward incline, a rocker member pivoted to the frame over the sickle bar and extending longitudinally thereof and having its front end connected with the sickle bar by a depending link, a lever extending rearwardly from the rocker member, a vertical link connecting said lever with the rearwardly extending arm, a pedal pivoted upon the tractor, bars extending towards each other from the pedal and the depending arm of said shaft and connected by a chain for turning the shaft and effecting tilting of the rocker member to raise the sickle bar.

JAMES H. WALLING.

REFERENCES CITED

The following references are of record in the file of this patent:

UNITED STATES PATENTS

| Number | Name | Date |
|---|---|---|
| 405,238 | Jones | June 11, 1889 |
| 1,616,629 | Jordan | Feb. 8, 1927 |
| 1,822,204 | Coultas | May 10, 1927 |
| 1,664,102 | Baseman | Mar. 27, 1928 |